June 24, 1930.  E. F. NORELIUS  1,767,254
STEERING MECHANISM
Filed Oct. 9, 1925   4 Sheets-Sheet 1

EMIL F. NORELIUS   INVENTOR.
BY
Merrill M. Blackburn
ATTORNEY.

June 24, 1930.  E. F. NORELIUS  1,767,254
STEERING MECHANISM
Filed Oct. 9, 1925  4 Sheets-Sheet 2

INVENTOR.
EMIL F. NORELIUS
BY
Merrill M. Blackburn
ATTORNEY.

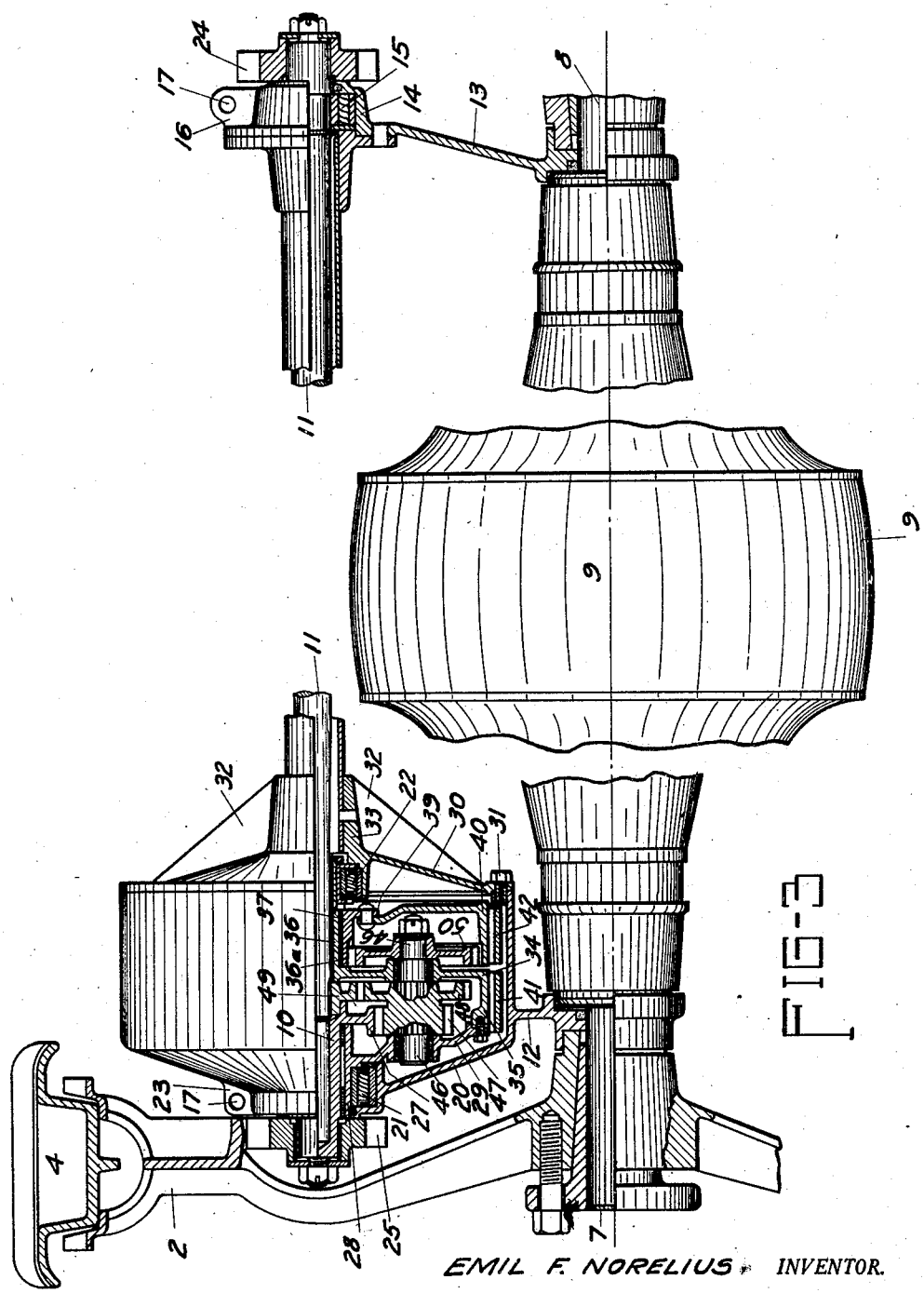

June 24, 1930.  E. F. NORELIUS  1,767,254
STEERING MECHANISM
Filed Oct. 9, 1925   4 Sheets-Sheet 4

EMIL F. NORELIUS INVENTOR.

Patented June 24, 1930

1,767,254

UNITED STATES PATENT OFFICE

EMIL F. NORELIUS, OF DAVENPORT, IOWA

STEERING MECHANISM

Application filed October 9, 1925. Serial No. 61,385.

Figure 1:
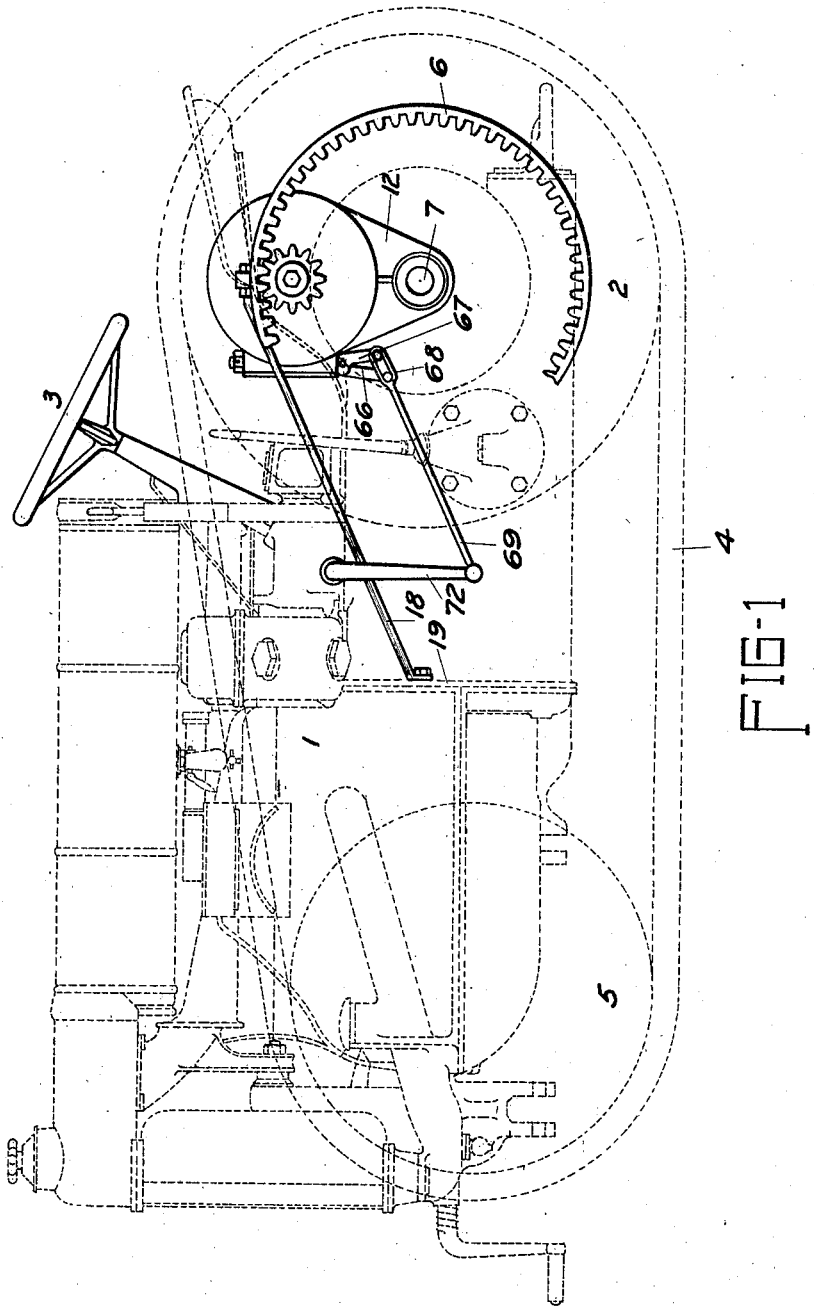

While my invention is designed primarily for use with a well known tractor, it should be understood that it is adaptable in its modified forms to other machines than the one referred to and shown in dotted outline in Fig. 1 of the present drawing. As shown herein, this is a substitute for the ordinary steering mechanism of a machine of the character indicated and is designed to be an improvement thereon. Among the objects of this invention are to provide a mechanism of the character indicated which can be readily substituted for the commercial steering mechanism of a machine of the type indicated; to provide an improved steering mechanism of the type indicated; to provide a steering mechanism which can be utilized in place of the ordinary steering mechanism of a machine of the character indicated, when converting this from the ordinary four wheeled type to the track-laying type; and such further objects, advantages and capabilities as will hereafter more fully appear and as are inherent in the construction disclosed.

My invention further resides in the combination, construction and arrangement of parts illustrated in the accompanying drawings and, while I have shown therein a preferred embodiment of my invention, I desire the same to be understood as illustrative only and not as limiting said invention.

Figure 2:
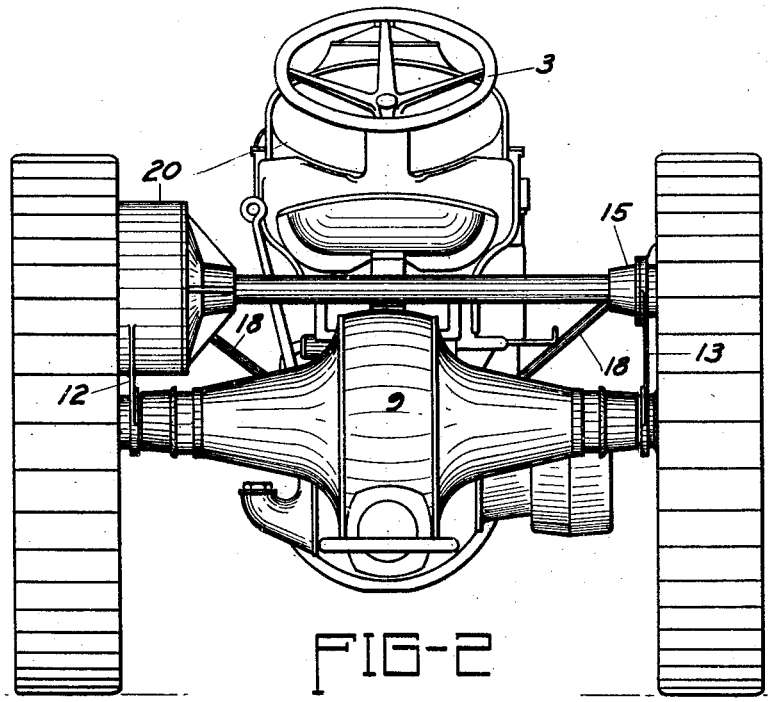
Figure 4:
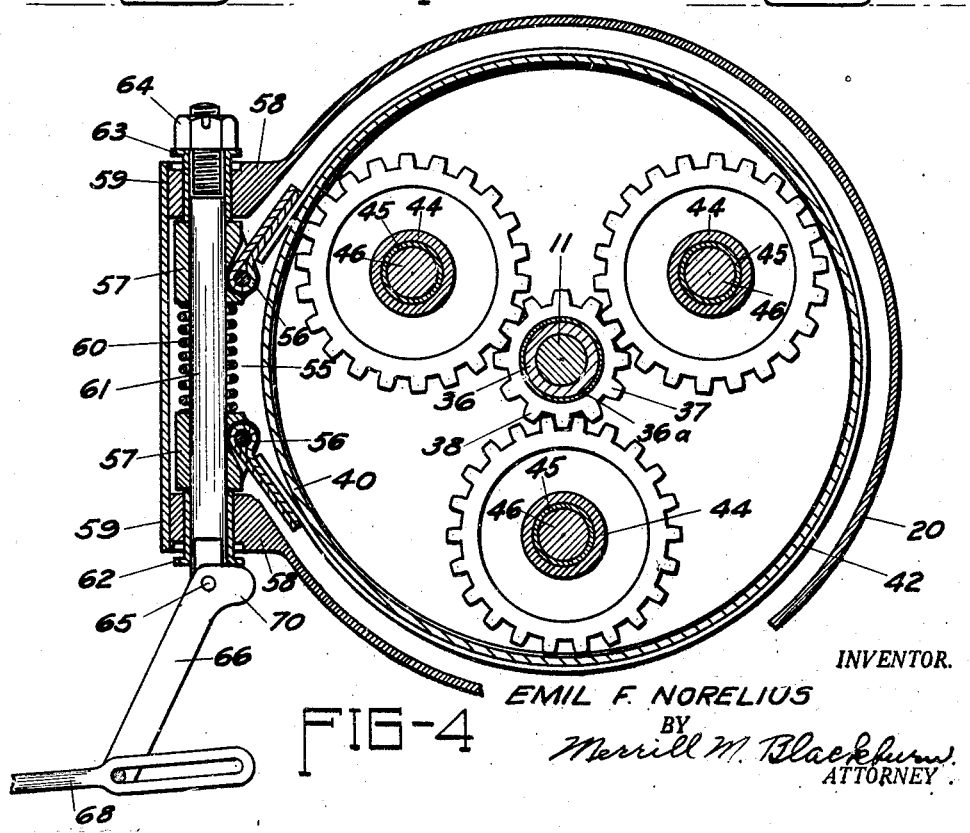
Figure 5:
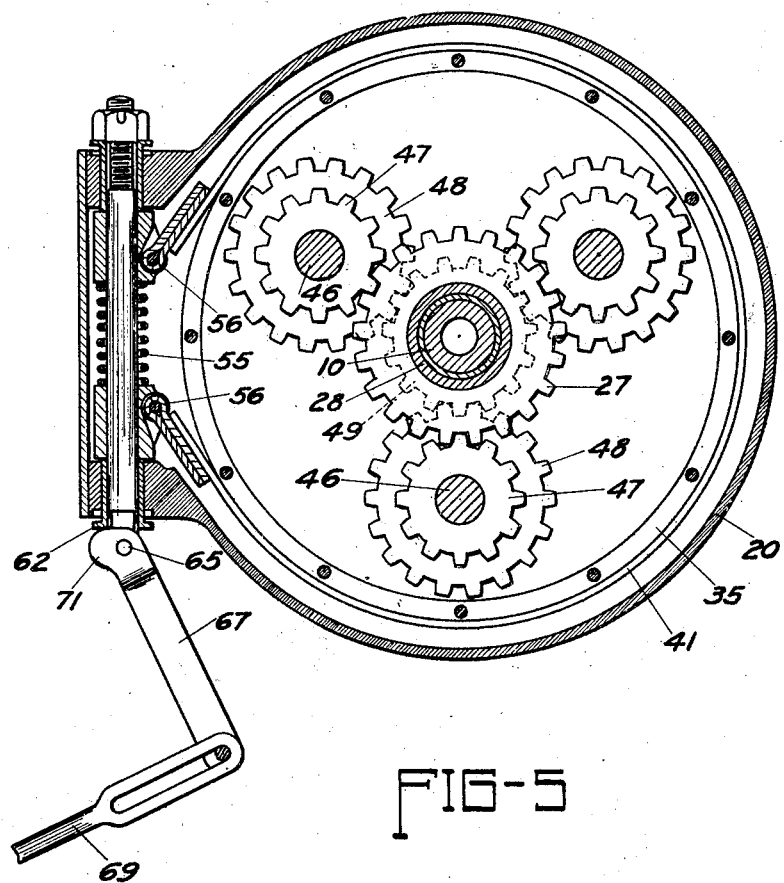

In the drawings annexed hereto and forming a part hereof, Fig. 1 is a side elevation of a well known tractor, the same being shown in dotted lines and having my new steering mechanism applied thereto, the latter being shown in full lines; Fig. 2 is a rear end elevation of such a tractor with my steering mechanism applied; Fig. 3 is a fragmentary sectional elevation with parts broken away, said view showing the relation of the ordinary driving axle, the differential gear case, and my new steering mechanism; Fig. 4 is a transverse section through the planetary gear casing of my steering mechanism, same being taken just at the right of the middle in Fig. 3; Fig. 5 is a similar view through the planetary casing taken just at the left of the planetary gears.

Referring more in detail to the annexed drawing, numeral 1 designates the tractor as a whole, the driving wheels being indicated by the numeral 2 and the steering wheel by the numeral 3. It should be here remarked that the ordinary tractor wheels are removed and replaced by special wheels adapted to receive a flexible track 4 of suitable construction. For this purpose, it is necessary to make the wheels 2 and 5 on opposite sides of the tractor align in a forward and rearward direction. Mounted upon the inside of the driving wheels 2 are ring gears 6 which are rigidly connected to or form a part of the driving wheels 2. It will be understood that the wheels 2 are mounted upon the customary tractor axle sections 7 and 8 which extend inwardly to the differential gear case 9, the internal construction and contents of which are well known and need not be here disclosed, no change being made therein. It will, of course, be understood that the driving wheels 2 may rotate at the same or different rates by reason of the interposition of the differential mechanism between the axle sections 7 and 8.

An interrupted shaft comprising the sections 10 and 11, the former of which is shown as a sleeve, is mounted, preferably, above the customary driving axle and is supported in position by the brackets 12 and 13 carried by the axle housing. At its upper end the bracket 13 carries a bearing housing 14 in which is mounted anti-friction means 15, the details of which need not be here shown. A web or fin 16 extends outwardly from the bearing housing 14, preferably in an upward direction, and is perforated at 17 for the reception of a brace rod 18 which is connected at its forward end to the engine, preferably to a flange 19, as shown in Fig. 1.

The bracket 12 has integral therewith, a planetary housing 20 in which are encased sets of planetary gears, the purpose of which will be disclosed later. Anti-friction bearings 21 and 22 are carried by opposite sides of the planetary housing but their structure is sufficiently well known to need no detailed disclosure. The planetary housing is provided with a web or fin 23 corresponding to the web 16 and this is provided with a perforation 17 which receives a brace rod 18 as referred to above.

At its right hand end the shaft section 11 carries a pinion 24 which meshes with one of the ring gears 6, while at its left end the shaft section 10 carries a corresponding pinion 25 which meshes with the other ring gear 6. From this it will be seen that when the wheels 2 are moving forwardly or backwardly at the same rate the pinions 24 and 25 will be caused to rotate in unison and consequently the shaft sections 10 and 11 will also rotate in unison. Shaft section 10 has a gear 27 integral therewith or rigidly secured thereto. Surrounding the shaft section 10 and spaced therefrom by bearing elements is a sleeve 28 which has a wall 29 extended therefrom in the manner of a disc wheel. This sleeve 28 furnishes a bearing member for the reception of the anti-friction member 21.

A disc 34 has an annular flange 35 and a sleeve hub 36, the former of which cooperates with the web 29 to form a gear housing surrounding part of the planetary gears above referred to, and serves as a brake drum, while the sleeve hub 36 surrounds the shaft section 11, thus supporting the gear housing upon opposite sides. Surrounding the sleeve hub 36 is a sleeve 37 provided at one end with gear teeth 38 and at its opposite end with a flange 39 to which is secured a web or spokes carrying, peripherally, a flange 40, which serves as a brake drum. Interposed between the sleeve hub 36 and sleeve 37 is a bushing 36ª. Brake bands 41 and 42 cooperate with the drums 35 and 40 in changing the speed of rotation of the planetary gear carrying elements.

The planetary housing includes a cover plate 30 which is secured in place by means of a plurality of bolts or the like 31, and is provided with wings or fins 32 which act as reinforcements. The cover plate 30 has a sleeve 33 which is provided at its inner end with a seat for the reception of the anti-friction bearing 22 which surrounds the shaft section 11 as is apparent from an inspection of Fig. 3.

The wall 29 of the planetary gear carrying elements is provided with a plurality of perforations which are surrounded by integral sleeves 44, said sleeves being lined by bushings 45 in which rotate stub shafts or axles 46 carrying gears 47, 48 and 50. The gears 47 mesh with gear 27 above referred to as being carried by shaft section 10, while gear 48 meshes with a gear 49 secured to the end of shaft section 11. When the shaft sections 10 and 11 rotate at the same speed, the tendency is for gear 49 to cause gear 48 to rotate at one speed, while gear 27 tends to cause gear 47 to rotate at a different speed. The gears 47 and 48 being integral with or rigidly secured to the shafts 46, it is impossible for these gears to rotate at different speeds and it is therefore necessary for the planetary carrying elements to rotate as a unit with the shaft sections 10 and 11. However, when the brake band 41 is applied to the brake drum 35, rotation of the planetary carrying elements is retarded or prevented and this forces the gears 27 and 49 to turn at different speeds. This, in turn, causes shaft sections 10 and 11 to turn at different speeds and results in pinions 24 and 25, ring gears 6 and driving wheels 2 traveling at different rates. In the actual construction, the relative rates of the driving wheels upon the right and left sides of the tractor, when the brake band 41 is applied so as to prevent rotation of the planetary carrying elements, are such that the ratio of travel between the left and right driving wheels will be approximately 1 to 2, thus causing a left turn.

When the brake band 42 is applied to the drum 40 to reduce or stop its rotation, rotation of the sleeve 37, carrying the gear teeth 38, is correspondingly reduced or stopped and this forces gears 50 to turn shafts 46 in accordance with the rate at which the shaft 46 travels around the shaft 11. Since the gears 47 and 48 are carried by the shaft 46 they rotate at the same speed as said shaft and cause a differential rotation of the gears 27 and 48, thus causing a corresponding rotation of the shaft sections 10 and 11, pinions 24 and 25, ring gears 6 and driving wheels 2. From this it results that the shaft section 10 causes the driving wheel 2 on the left hand side to travel at greater speed than the corresponding wheel on the right hand side, thus causing a right hand turn.

At the front side of the planetary housing is an opening 55 by means of which access can be had to the interior of the housing. The ends 56 of the brake bands 41 and 42 are secured to sliding blocks 57 within the opening 55 which has a thickened wall surrounding the same to form a flange 58. To this flange is secured, by any suitable means, a plate 59 which permanently closes the opening and prevents dust from gaining access to the interior of the planetary housing. The blocks 58 are pressed away from each other by springs 60 surrounding the bolts 61 which are also surrounded by the flanged sleeves 62 and 63. Adjustment of the brake bands is secured by means of the nuts 64 which may be tightened or loosened on the bolts, thus bringing the blocks 57 closer together or permitting them to rest farther apart at neutral position. The ends of the bolts 61, opposite the screw-threaded ends, are pivotally connected at 65 with the cam levers 66 and 67 which are actuated by slotted links 68 and 69.

As shown in Fig. 4, the link 68 is just about to rock lever 66 about its pivot 65 so as to cause cam 70 to press against the flange of sleeve 62 forcing the same inwardly. At the same time, the bolt 61 will be pulled downwardly, forcing sleeve 63 inwardly, thereby causing blocks 57 to approach. This results in the brake band being tightened about the drum 40, thereby reducing or stopping rotation thereof. This, as explained above, causes a right hand turn. When a left hand turn is desired, the steering wheel 3 is turned to the left and this causes the slotted link 69 to rock the lever 67 about its pivot 65 thus tightening the brake band as previously described in connection with Fig. 4. When the mechanism is in position for the machine to go straight ahead, the levers 66 and 67 are substantially as shown in Figs. 4 and 5. When the steering wheel 3 is turned to the right the links 68 and 69 move rearwardly, the link 68 rocking lever 66 about its pivot, while the slot in link 69 permits the same to move idly and without having any effect upon the lever 67. However, when the steering wheel is turned in the opposite direction, link 69 rocks lever 67 about its pivot, as described above, causing cam 71 to engage the flange of the cooperating sleeve 62. The links 68 and 69 are connected at their forward end to the crank arm 72, as shown in Fig. 1, said crank arm being actuated in a well known manner by turning of the steering wheel 3.

While I have disclosed herein certain specific mechanism for accomplishing the desired result, I desire this disclosure to be understood as illustrative only of what is now considered the best mode of carrying my invention into practice.

Having now described my invention, I claim:—

1. In a steering mechanism, the combination of differential means, a pair of shafts driven thereby, power wheels mounted on said shafts and carrying ring gears, an interrupted shaft carrying a pair of pinions meshing with the ring gears and means cooperating with the sections of the interrupted shaft whereby the sections of the shaft may be permitted to rotate as a unit or caused to rotate at different rates.

2. In a steering mechanism, a pair of aligned shafts, differential means whereby the shafts may be driven in unison or permitted to turn at different rates, driving wheels carried by said shafts, an interrupted shaft, means connecting the respective parts thereof in driving relation with the driving wheels, means connecting the sections of the interrupted shaft so that they may move at the same or at different rates and means whereby one section of the interrupted shaft may be retarded in its rotation and the rate of rotation of the other section be increased accordingly.

3. In a tractor having differentially controlled driving wheels, means connecting the driving wheels so that they may be rotated in unison or one of them may be retarded while the other is correspondingly accelerated, said last mentioned means including connected sets of planetary gearing, rotatable carrying means therefor, and braking means for varying the rate of rotation of the carrying means or preventing the rotation of same, and a non-rotatable housing enclosing said planetary gearing and brakes.

4. In a steering mechanism, a planetary casing, a pair of aligned shafts, a gear sleeve surrounding one of said shafts, adjacent an end thereof, a gear rigid with each of said shafts, a housing surrounding a part at least of said gears, said gear sleeve being external to said housing, a shaft carried by said housing and gears rigid with said last mentioned shaft and engaging the aforesaid gears and the gear of the gear sleeve.

5. In a steering mechanism, a pair of driving wheels, differentially actuated shafts upon which said wheels are rigidly mounted, gears connected to said wheels, pinions meshing therewith, a pair of shafts on which said pinions are mounted, planetary gearing mechanism connecting said last mentioned shafts whereby they may be driven at the same speed by said driving wheels, brake mechanism for retarding the rotation of one of said shafts, a steering wheel, a non-rotatable casing enclosing the planetary mechanism and brakes, and connection between the steering wheel and the brake mechanism for actuating the latter.

6. In a tractor having differentially controlled driving wheels, means connecting the driving wheels so that they may be rotated in unison or one of them may be retarded while the other is correspondingly accelerated, said last mentioned means including connected sets of planetary gearing, rotatable carrying means therefor, braking means engaging the carrying means and acting directly thereon for varying the rate of rotation of the carrying means or preventing the rotation of same, brake operating means extending from the braking means, and a steering wheel connected to the operating means and causing the braking means to be effective in producing changes in the rate of rotation of the rotatable carrying means.

7. In a tractor having a driving axle and a differential interposed therein, a steering mechanism including a planetary casing having means whereby the casing may be readily mounted upon or dismounted from an end of the driving axle, an interrupted shaft extending through the casing, means for supporting an end of the shaft upon the other end of the driving axle, driving wheels secured to the driving axle, and operative connections between the driving wheels and the interrupted shaft, whereby the functioning of the wheels may be controlled through the shaft.

8. In a tractor having a driving axle and a differential interposed therein, a steering mechanism including a planetary casing having means whereby the casing may be readily mounted upon or dismounted from an end of the driving axle, an interrupted shaft extending through the casing, means within the casing for controlling the relative rates of rotation of the sections of the shaft, means for supporting an end of the shaft upon the other end of the driving axle, driving wheels secured to the driving axle, and operative connections between the driving wheels and the interrupted shaft, whereby the functioning of the wheels may be controlled by the mechanism within the casing.

9. In a mechanism of the character described, a pair of aligned shafts carrying adjacent their remote extremities a pair of pinions, drive wheels carrying gears meshing with said pinions, a housing surrounding the inner ends of said shafts, a housing within the housing surrounding the inner ends of said shafts, the external surface of the second mentioned housing forming a brake drum, axles mounted in the second mentioned housing, gears rigidly connected with said axles, gears on the proximate ends of said shafts meshing with the first named gears, a gear sleeve surrounding one of said aligned shafts and carrying a brake drum, brakes cooperating with said brake drums, and connections between the gear sleeve and the shafts whereby operation of the brakes may control the relative rates of rotation of said shafts and the direction of travel of the machine.

10. In a steering mechanism, a pair of driving wheels, differentially actuated shafts directly connected to said wheels, gears connected to said wheels, pinions meshing therewith, a pair of shafts on which said pinions are mounted, a planetary housing mounted on one of said differentially actuated shafts and non-rotatable with relation to the casing for the differentially actuated shafts, planetary gearing mechanism in said housing connecting said second mentioned shafts whereby they may be driven at the same speed by said driving wheels, and brake mechanism for retarding the motion of rotation of one of said second mentioned shafts.

11. In a steering mechanism, a pair of driving wheels, differentially actuated shafts directly connected to said wheels, a planetary housing mounted upon one of said shafts, an interrupted shaft associated with the first mentioned shafts and passing through said housing, connections between said wheels and the sections of the interrupted shaft whereby the latter are actuated by movement of the driving wheels, planetary means connecting the parts of said interrupted shaft so that they normally operate in unison, and means for retarding one of the shaft sections and thereby similarly affecting the operation of its connected driving wheel and increasing the rate of operation of the other wheel.

12. In a steering mechanism, the combination of differential means, a pair of shafts driven thereby, power wheels, connections between the shafts and the power wheels, an interrupted shaft carrying a pair of pinions, connections between the pinions and the power wheels, means connecting the sections of the interrupted shaft whereby the sections of the shaft may be permitted to rotate as a unit or caused to rotate at different rates, and a non-rotatable housing surrounding said last mentioned means, said housing being carried by one of the first mentioned shafts.

In witness whereof, I hereunto subscribe my name to this specification.

EMIL F. NORELIUS.